United States Patent [19]

Nicholson et al.

[11] 4,295,594
[45] Oct. 20, 1981

[54] LAMINATED JET PIPE RECEIVER PLUG ASSEMBLY METHOD AND STRUCTURE

[75] Inventors: Robert D. Nicholson, Birmingham; Alger T. Daniel, Clawson, both of Mich.

[73] Assignee: Koehring Company, Brookfield, Wis.

[21] Appl. No.: 41,494

[22] Filed: May 22, 1979

[51] Int. Cl.³ .................... B23K 1/20; B23P 13/00
[52] U.S. Cl. .................................. 228/160; 228/174; 228/190; 29/418
[58] Field of Search .............. 228/160, 161, 174, 190, 228/162; 29/418, 157.1 R; 91/3; 137/83; 428/586

[56] References Cited

U.S. PATENT DOCUMENTS

| | | | |
|---|---|---|---|
| 3,441,996 | 5/1969 | Boothe | 29/157.1 R X |
| 3,561,476 | 2/1971 | Mandroian et al. | 137/83 |
| 3,765,437 | 10/1973 | Pruvot et al. | 91/3 X |

FOREIGN PATENT DOCUMENTS 1450380 9/1976 United Kingdom .......... 29/157.1 R

*Primary Examiner*—Gil Weidenfeld
*Assistant Examiner*—K. J. Ramsey
*Attorney, Agent, or Firm*—Whittemore, Hulbert & Belknap

[57] ABSTRACT

Laminated plate cylindrical receiver plug assembly structure having rectangular cross section passages therein which extend axially of the plug assembly through one end thereof on opposite sides of a very narrow divider plate and radially out of the plug assembly on opposite sides of the divider plate from the side on which the axially extending portion of the passages are on is produced by producing a plurality of separate plates having axially and/or transversely extending openings in one end thereof in rectangular form, coating every other one of the plates with brazing material, placing the rectangular plates in side by side surface engagement with the openings therein in alignment to form rectangular cross section axially and radially extending passages through the plug assembly and subjecting them to brazing temperature and pressure and then machining the ends of the brazed together rectangular plates having the openings therein into a cylindrical form and cutting off the other end of the plates.

8 Claims, 13 Drawing Figures

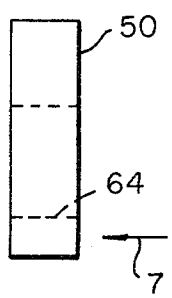
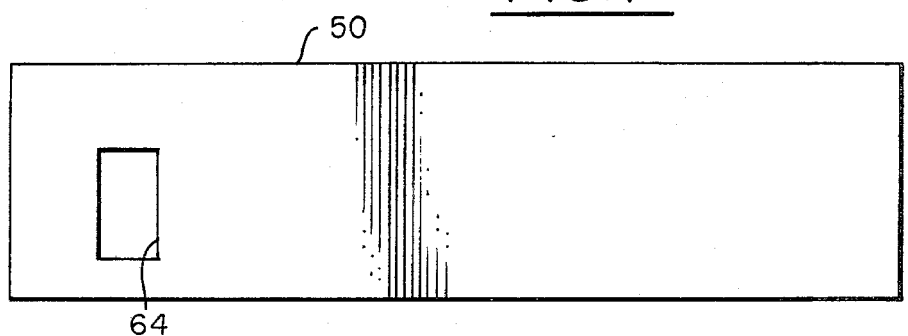
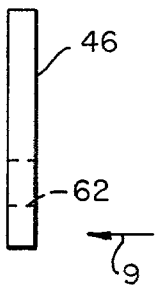
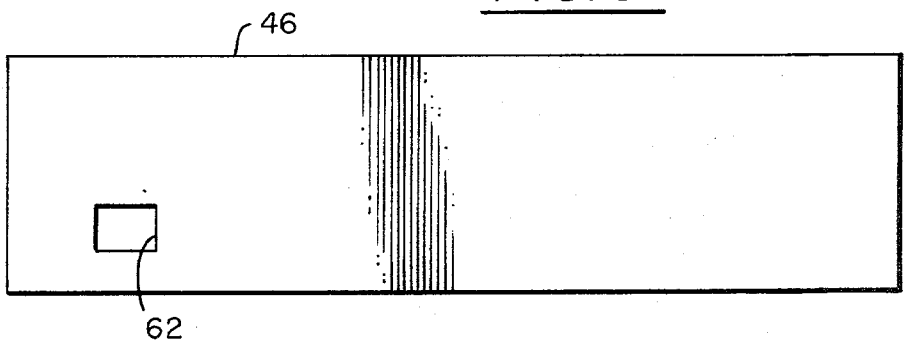
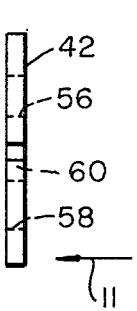
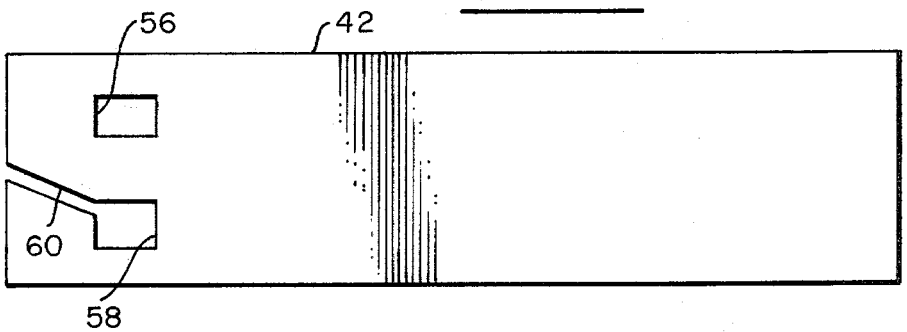
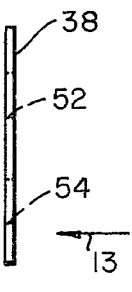
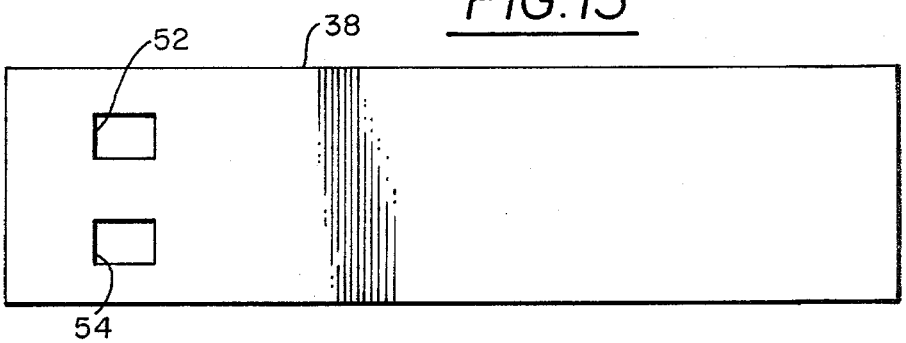

LAMINATED JET PIPE RECEIVER PLUG ASSEMBLY METHOD AND STRUCTURE

BACKGROUND OF THE INVENTION

1. Field of the Invention

The invention relates to jet receivers for electrohydraulic servovalves or the like and refers more specifically to a method of producing a laminated receiver plug assembly and the laminated receiver plug assembly produced by the method.

2. Description of the Prior Art

In the past, jet pipe receivers have generally been solid members having passages machined therein which passages usually have extended first axially into one end of the receiver structure and then radially through opposite sides thereof. The axially extending portions of the receiver structure passages have generally been round in cross section and separated by an extremely thin divider portion at the point of receiving fluid from a jet pipe. The divider portion has necessarily been required to be constructed to close tolerances. Such tolerances are difficult to maintain, particularly in view of the relatively small dimensions of some jet pipe receivers, their passages, and the divider portion between some passages therein. Further, the round cross section of the axially extending portions of the prior receiver structure passages have made prior jet pipe receivers sensitive to nozzle misalignment in the direction of extent of the divider portion.

Therefore, a good deal of waste material and machining hours have been accumulated in production of prior jet pipe receivers due to the tolerance limitations and size of such receivers and the usual method of production of the receivers by conventional machining. Also, the jet pipe receivers produced by conventional machining from solid metal have not been as uniform and therefore as efficient as desired and have been more expensive than necessary.

SUMMARY OF THE INVENTION

The jet pipe receiver structure produced by the method of the invention is a cylindrical jet pipe receiver formed of a plurality of separate plates extending axially of the jet pipe receiver brazed together, the separate plates having aligned openings therein to provide square cross section axially extending and then radially extending passages in the jet pipe receiver. The axially extending passage portions are on opposite sides of a thin divider plate. The radially extending passage portions open on the side of the jet pipe receiver opposite the side of the divider plate on which the connected axially extending passage portion is positioned.

The laminated receiver plug assembly of the invention is constructed by producing a plurality of separate, flat, rectangular plates having axially and/or transversely extending openings therethrough, placing the plates in side by side surface engaged relation with the openings therethrough communicating with each other to form the axially and then radially extending passages in the finished receiver plug assembly, alternate ones of which plates are coated with brazing material and then subjecting the rectangular laminated plate assembly to brazing temperature and pressure. One end of the brazed structure is then machined to a cylindrical configuration, after which the other end of the laminated plate assembly is cut off.

BRIEF DESCRIPTION OF THE DRAWINGS

FIG. 6 is an end view of an end plate of the laminated plate structure illustrated in FIGS. 2 through 5.

FIG. 7 is an elevation view of the end plate illustrated in FIG. 6, taken in the direction of arrow 7 in FIG. 6.

FIG. 8 is an end view of a receiver plate of the laminated plate structure illustrated in FIGS. 2 through 5.

FIG. 9 is an elevation view of the receiver plate illustrated in FIG. 8, taken in the direction of arrow 9 in FIG. 8.

FIG. 10 is an end view of a port plate of the laminated plate structure shown in FIGS. 2 through 5.

FIG. 11 is an elevation view of the port plate shown in FIG. 10, taken in the direction of arrow 11 in FIG. 10.

FIG. 12 is an end view of the divider plate of the laminated plate assembly illustrated in FIGS. 2 through 5.

FIG. 13 is an elevation of the divider plate illustrated in FIG. 12, taken in the direction of arrow 13 in FIG. 12.

DESCRIPTION OF THE PREFERRED EMBODIMENT

Figure 1:
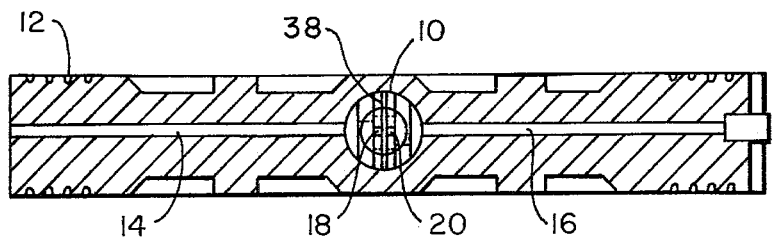
FIG. 1 is an elevation view of a spool valve of an electrohydraulic jet pipe servovalve, including a laminated jet pipe receiver plug assembly positioned therein, constructed in accordance with the method of the invention.

As shown in FIG. 1, the laminated jet pipe receiver assembly 10 of the invention is positioned in the spool valve 12 of a jet pipe electrohydraulic servovalve. One such jet pipe electrohydraulic servovalve is disclosed in detail in patent application Ser. No. 041,493, filed May 22, 1979 and assigned to the same assignee as the present application.

As shown in FIG. 1, the spool valve 12 includes separate axially extending passages 14 and 16 therein. Passage 16 is as shown in communication with the axially extending portion of passage 18 of the laminated jet pipe receiver assembly 10. Passage 14 is similarly in communication with the axially extending portion of passage 20 through the receiver assembly 10. The axially extending portions of the passages 18 and 20 are separated by the very thin divider plate 38 in accordance with the invention.

Figures 2, 3:
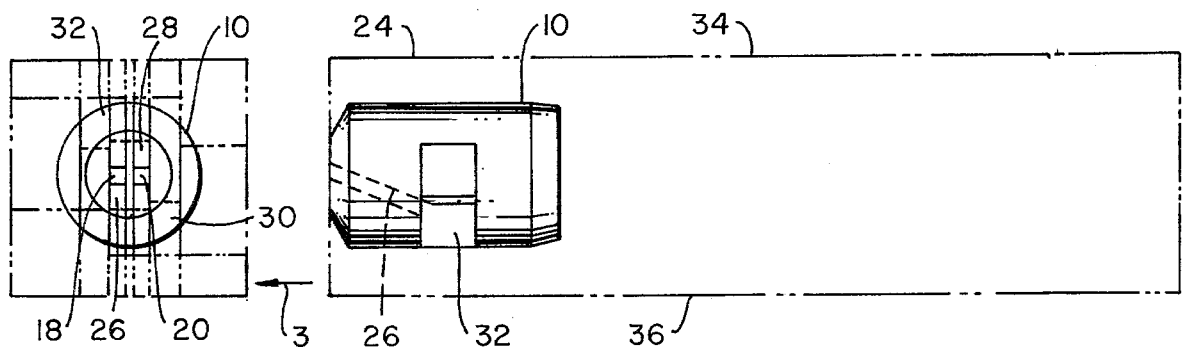
FIG. 2 is an end view of the receiver plug assembly of the invention, showing the laminated plate structure from which it is machined, in phantom.
FIG. 3 is an elevation view of the receiver plug assembly illustrated in FIG. 2, taken substantially in the direction of arrow 3 in FIG. 2, again showing the laminated plate structure in phantom.

The laminated jet pipe receiver assembly 10, as shown best in FIGS. 2 and 3, is cylindrical and is machined from one end 24 of a plurality of separate rectangular plates placed in surface to surface contact and brazed together into laminated plate structure 36. As shown best in FIGS. 2 and 3, the passages 18 and 20 of the laminated jet pipe receiver assembly 10 include the axially extending portions 26 and 28 having a rectangular cross section and the radially extending portions 30 and 32, respectively.

After the end 34 of the laminated plate structure 36 from which the jet pipe receiver assembly 10 is machined has been used to hold the plate structure 36 for machining purposes, it is cut from the jet pipe receiver assembly 10 and may be discarded or the metal therein recycled.

Figure 4:
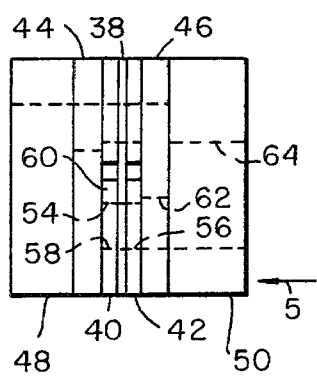
FIG. 4 is an end view of the laminated plate structure illustrated in phantom in FIG. 2.
Figure 5:
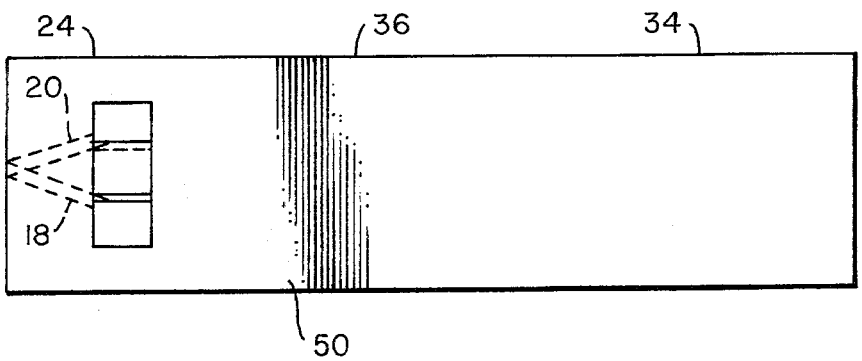
FIG. 5 is an elevation view of the laminated plate structure illustrated in FIG. 4, taken in the direction of arrow 5 in FIG. 4.

As shown best in FIGS. 4 and 5, the laminated plate structure 36 from which the cylindrical jet pipe receiver assembly 10 is machined includes seven separate rectangular plates. There is a central divider plate 38 which is extremely thin and divides the stream of fluid from a jet pipe between the passages 18 and 20 in use of the spool valve 12 in a jet pipe receiver electrohydraulic servovalve. Separate port plates 40 and 42 are provided on opposite sides of the divider plate 38. Receiver plates 44 and 46 are in surface to surface engagement with the sides of the port plates 40 and 42, not in engagement with the divider plate 38. The end plates 48 and 50, in surface to surface engagement with the receiver plates 44 and 46, as shown best in FIG. 4, complete the laminated plate structure 36.

As shown best in FIG. 13, the divider plate 38 is rectangular and is very thin. It may be in the order of 0.001 inches thick. The divider plate includes therein the transversely extending rectangular openings 52 and 54 extending through one end thereof as shown in FIGS. 12 and 13.

The port plates 40 and 42 are again rectangular plates and have the same size transverse rectangular openings 56 and 58 therein as the divider plate. An axially extending transverse opening 60, which ultimately provides part of the axially extending portions 26 and 28 of passages 18 and 20, is also provided in one end of the port plates as shown in FIG. 11. The port plates 40 and 42 are constructed exactly the same.

In assembly of the port plates 40 and 42 with the divider plate 38, the port plates are reversed so that the openings 60 diverge on opposite sides of the divider plate 38, as shown by passages 18 and 20 in FIG. 5. The openings 52 and 54 of the divider plate are aligned with opposite ones of the openings 56 and 58 on opposite sides of the divider plate.

The receiver plates 44 and 46 are again exactly the same and are rectangular. Receiver plates 44 and 46 include a single rectangular opening 62 extending transversely therethrough adjacent one end thereof. Opening 62 is slightly larger than openings 52, 54, 56 and 58. In assembly with the divider plate and port plates, the receiver plates are positioned so that the openings 62 are in communication with the openings 56 in the port plates.

End plates 48 and 50, as shown in FIGS. 6 and 7, are again rectangular and are provided with an opening 64 therethrough which is of greater extent in one dimension of the rectangular plate than the opening 62, as shown best in FIG. 7. The transversely extending opening 64 is positioned on opposite sides of the laminated plate structure 36 so as to be in communication with the openings 62 through the receiver plates.

With the divider plate 38, port plates 40 and 42, receiver plates 44 and 46, and end plates 48 and 50 assembled as shown best in FIGS. 4 and 5, the passage 18 will, for example, extend axially along the opening 60 in port plate 40 into the opening 58. The passage 18 then proceeds radially through the openings 54, 62 and 64.

The passage 20 will similarly proceed from openings in port plate 42 similar to openings 60 and 58 in port plate 40 and through opening 52 in the divider plate 38 and through openings in the receiver and end plates 44 and 48 similar to openings 62 and 64 in the receiver plate 46 and end plate 50.

The method of constructing the laminated jet pipe receiver structure 10 includes the steps of first producing the separate plates 38, 40, 42, 44, 46, 48 and 50 having openings therein as shown in FIGS. 6–13. Two port plates, receiver plates and end plates must be produced. Alternate plates, that is, for example, the divider plate and the receiver plates, are coated with brazing material, after which the plates are placed together as shown best in FIGS. 4 and 5, and are subjected to brazing heat and temperature to braze the laminated plate structure 36 shown in FIGS. 4 and 5 together with the plates in surface to surface contact.

The laminated plate structure 36, shown best in FIG. 5, is then gripped at end 34 in machining structure such as a lathe and the cylindrical jet pipe receiver assembly 10 is machined from the end 24 of the laminated plate structure 36. After the cylindrical structure 10 has been machined, the end 34 is cut from the jet pipe receiver assembly 10 to complete the jet pipe receiver assembly 10 having the axially and radially extending passages 18 and 20 extending therethrough, the axially extending portions of which are separated by the divider plate 38.

Such structure is not only simple and economical to produce, but the tolerances of the passages therethrough and of the divider plate at the passages are maintained exact at all times without the necessity of extremely accurate machining. Further, since the axially extending portions 26 and 28 of the passages 18 and 20 have a rectangular cross section, the receiving assembly 10 is relatively insensitive to nozzle misalignment transversely of the spool 12 as shown in FIG. 1.

While one embodiment of the present invention has been considered in detail, it will be understood that other embodiments and modifications thereof are contemplated. It is the intention to include all embodiments and modifications as are defined by the appended claims within the scope of the invention.

We claim:

1. The method of manufacturing a laminated jet pipe receiver plug assembly comprising preparing a rectangular divider plate with a pair of spaced apart transverse openings extending therethrough adjacent one end thereof, preparing a pair of rectangular port plates having spaced apart transverse openings therein adjacent one end thereof adapted to align with the openings through the divider plate, one of which openings has an axially extending transverse opening in communication therewith extending through one end of the port plate, preparing a pair of rectangular receiver plates having one transverse opening therein adjacent one end thereof adapted to align with opposite openings in the port plate and divider plate on opposite sides of the divider plate, preparing a pair of rectangular end plates having one transverse opening therein adjacent one end thereof adapted to align with the one opening in the receiver plates and larger than the openings in the receiver plates, coating the divider plate and the receiver plates with a brazing compound, placing the port plates adjacent the opposite sides of the divider plates and the receiver plates adjacent the other sides of the port plates and the end plates adjacent the other side of the receiver plates in surface to surface contact therewith with the openings therethrough in alignment to provide a passage through the opening in the end of one port plate through the divider plate and through the other port plate, one receiver plate and one end plate and a passage through the passage in the end of the other port plate through the divider plate and then through the passages in the one port plate and the other receiver plate and other end plate, subjecting the plates so assembled to brazing temperature and pressure to braze them together into a solid laminated rectangular unit and subsequently machining the one end of the laminated plates into a cylindrical configuration and then cutting off the other end of the laminated plates.

2. The method of manufacturing a receiver plug assembly structure comprising preparing a plurality of plates with openings extending therethrough which are positioned to provide passages through the receiver plug assembly when the plates are positioned adjacent to each other in surface to surface contact, said plurality of plates including at least one centrally located divider plate having spaced apart transverse openings therethrough and at least one port plate positioned on each side of the divider plate having transverse openings therethrough, which openings are aligned with the openings through the divider plate and a transverse opening extending through the end of each of the port plates in communication with separate ones of the aligned openings through the divider plate, placing a brazing compound on selected surfaces of the plates, assembling the plates in surface to surface contact to provide the passages through the receiver plug assembly, subjecting the assembled plates to brazing temperature and pressure to braze them together, and machining the brazed-together plates into the desired exterior form of the receiver plug assembly.

3. The method of manufacturing a receiver plug assembly structure comprising preparing a plurality of plates with openings extending therethrough which are positioned to provide passages through the receiver plug assembly when the plates are positioned adjacent to each other in surface to surface contact, placing a brazing compound on selected surfaces of the plates, assembling the plates in surface to surface contact to provide the passages through the receiver plug assembly, subjecting the assembled plates to brazing temperature and pressure to braze them together, and machining the brazed-together plates into the desired exterior form of the receiver plug assembly including cutting off of one end of the brazed-together plates.

4. The method as set forth in claim 2 wherein every other plate is coated with brazing compound prior to the brazing step.

5. The method as set forth in claim 2 wherein the machining step includes machining the brazed-together plates into a cylindrical configuration with the plates extending axially of the cylindrical configuration.

6. The method as set forth in claim 3 wherein every other plate is coated with brazing compound prior to the brazing step.

7. The method as set forth in claim 3 wherein the machining step includes machining the brazed-together plates into a cylindrical configuration with the plates extending axially of the cylindrical configuration.

8. The method as set forth in claim 2 wherein the plurality of plates further includes a separate receiver plate and a separate end plate in order adjacent each port plate having progressively larger transverse openings therein in communication with only one of the aligned openings in the separate port plates and the divider plate on each side of the divider plate.

* * * * *